(12) United States Patent
Heidasch et al.

(10) Patent No.: US 8,769,502 B2
(45) Date of Patent: Jul. 1, 2014

(54) TEMPLATE BASED ASYNCHRONY DEBUGGING CONFIGURATION

(75) Inventors: Robert Heidasch, Speyer (DE); Albert Rossmann, Wieslch (DE)

(73) Assignee: SAP AG, Walldorf (DE)

( * ) Notice: Subject to any disclaimer, the term of this patent is extended or adjusted under 35 U.S.C. 154(b) by 1210 days.

(21) Appl. No.: 11/963,789

(22) Filed: Dec. 21, 2007

(65) Prior Publication Data

US 2009/0164981 A1 Jun. 25, 2009

(51) Int. Cl.
*G06F 9/44* (2006.01)

(52) U.S. Cl.
USPC ............ 717/129; 717/124; 717/127; 717/131

(58) Field of Classification Search
CPC ............ G06F 11/3664; G06F 11/3644; G06F 11/3636; G06F 11/36; G06F 11/362
See application file for complete search history.

(56) References Cited

U.S. PATENT DOCUMENTS

| | | | | |
|---|---|---|---|---|
| 5,687,375 | A * | 11/1997 | Schwiegelshohn | 717/129 |
| 5,845,125 | A * | 12/1998 | Nishimura et al. | 717/129 |
| 6,263,456 | B1 * | 7/2001 | Boxall et al. | 714/31 |
| 7,216,257 | B2 * | 5/2007 | Kilian | 714/31 |
| 7,370,320 | B1 * | 5/2008 | Grossman et al. | 717/131 |
| 7,383,539 | B2 * | 6/2008 | Bates et al. | 717/129 |
| 7,472,378 | B2 * | 12/2008 | Bennett et al. | 717/129 |
| 7,694,282 | B2 * | 4/2010 | Arkhipov et al. | 717/129 |
| 2002/0087950 | A1 * | 7/2002 | Brodeur et al. | 717/124 |
| 2002/0112244 | A1 * | 8/2002 | Liou et al. | 725/93 |
| 2003/0088854 | A1 * | 5/2003 | Wygodny et al. | 717/130 |
| 2005/0066314 | A1 * | 3/2005 | Bates et al. | 717/129 |
| 2005/0172168 | A1 * | 8/2005 | Kilian | 714/31 |
| 2007/0055958 | A1 * | 3/2007 | Birenheide et al. | 717/124 |
| 2007/0168994 | A1 * | 7/2007 | Barsness et al. | 717/129 |
| 2007/0168997 | A1 * | 7/2007 | Tran | 717/129 |
| 2009/0150870 | A1 * | 6/2009 | Bates | 717/129 |
| 2009/0164976 | A1 * | 6/2009 | Gritter et al. | 717/127 |

OTHER PUBLICATIONS

Marc L. Corliss et al., Low-Overhead Interactive Debugging via Dynamic Instrumentation with DISE, 2005 IEEE, 12 pages, <http://ieeexplore.ieee.org/stamp/stamp.jsp?tp=&arnumber=1385953>.*
Richard Moore, A Universal Dynamic Trace for Linux and other Operating Systems, 2001 USENIX, 13 pages, <https://www.usenix.org/legacy/event/usenix01/freenix01/full_papers/moore/moore.pdf>.*
Ing-Jer Huang et al., A Retargetable Embedded In-circuit Emulation Module for Microprocessors, 2002 IEEE, 22 pages, <http://citeseerx.ist.psu.edu/viewdoc/download?doi=10.1.1.99.2511&rep=rep1&type=pdf>.*
Daniel Crompton, Another day another bug, 2003 Queue, pp. 58-61, <http://dl.acm.org/citation.cfm?id=945131.945156>.*

(Continued)

*Primary Examiner* — Thuy Dao
*Assistant Examiner* — Cuong V Luu
(74) *Attorney, Agent, or Firm* — Mintz Levin Cohn Ferris Glovsky and Popeo, P.C.

(57) ABSTRACT

A system and method for debugging a running process of an application or component are disclosed. A debugging agent runs one or more templates. Each template is configured with a breakpoint set defined in debugging code for stopping execution of the running process according to one or more breakpoints. One or more debugging clients each includes a user interface for defining at least one of the one or more templates. Each debugging client is selectable to receive debugging information of the running process based on the breakpoint set.

13 Claims, 2 Drawing Sheets

(56) References Cited

OTHER PUBLICATIONS

Akira Mori et al., A Tool for Analyzing and Detecting Malicious Mobile Code, 2006 ACM, pp. 831-834, <http://dl.acm.org/citation.cfm?id=1134285.1134426>.*

Bart Vermeulen et al., Automatic Generation of Breakpoint Hardware for Silicon Debug, 2004 ACM, p. 514-517, <http://ieeexplore.ieee.org/stamp/stamp.jsp?tp=&arnumber=1322535>.*

* cited by examiner

TEMPLATE BASED ASYNCHRONY DEBUGGING CONFIGURATION

BACKGROUND

This disclosure relates generally to enterprise software systems, and more particularly to template based asynchronous debugging of enterprise software.

For software developers and sellers, there is often a need to analyze problems in a customer's system. Problems can be analyzed by debugging an application on the customer's site without transferring or installing a program integrated development environment (IDE) and source code. This is especially the case where the customer only allows very restricted access to their system, such as when the customer treats any access as a security issue.

From a support perspective, problem analysis typically requires a common set of information in the form of data that describes or provides the system state. In practice, the application expert or developer sets some checkpoints, known as breakpoints, within the application, and evaluates its data. The same pattern can be developed for specific components—the developer sets in program breakpoints that allow checking the program execution and its state. However, such typical schemes of problem discovery and analysis are complex, resource intensive, and often require too much access or modification of the software under test.

SUMMARY

In general, this document discusses an asynchronous debugging system and method that simplifies problem detection and analysis of applications or components using a Web services interface.

A template-based debugging configuration is defined for the asynchronous debugging system and method that can be transferred to the customer and activated in the customer's system. The configuration transfer and activation is done without stopping the process execution (e.g. execution of Java process, or ABAP process), and provides the configuration of both "hard" and "soft" breakpoints. A hard breakpoint stops the process execution, which is the normal behavior of a standard debugger. A "soft" breakpoint only temporarily stops the process execution, and can be used as an "intelligent" trace that enables a developer to execute a designated process or its simulation later. The hard and soft breakpoints are defined for the asynchronous debugger in a debugging client, and a Web services interface is used to transfer the breakpoint to debugging agent. That allows debugging or tracing of both local and remote systems running on different operating systems (OSs) and different technology (Java, ABAP, C#, etc.).

The system and method provides the business expert/developer an "offline" breakpoint configuration, which means that the debugging client is not connected to the agent and can maintain (create, modify or delete) a particular "breakpoint set" template. After the debugging client connects to the debugging agent, it can transfer and activate a template in any local or remote systems, e.g. customer systems. The communication between each debugging client and the local running debugging agent is preferably based on a Web services standard.

In one aspect, a system for debugging a running process of an application or component includes a debugging agent running one or more templates. Each template is configured with a breakpoint set defined in debugging code for stopping execution of the running process according to one or more breakpoints. The system further includes one or more debugging clients. Each debugging client includes a user interface for defining at least one of the one or more templates, and is selectable to receive debugging information of the running process based on the breakpoint set.

In another aspect, a method of debugging a running process of an application or component includes the steps of defining a template in an integrated design environment of a debugging client. The template includes a breakpoint set that defines a set of breakpoints within a running process by which the running process is stopped. The method further includes the steps of executing the template by a debugging agent, and gathering, with the debugging agent, debugging data related to the running process at each of the set of breakpoints. The method further includes transferring the debugging data to the debugging client.

In yet another aspect, a template based asynchronous debugging system includes a plurality of debugging clients, where each debugging client is hosted in an integrated development environment that is adapted to enable creation of a debugging template by a user. The debugging system further includes a debugging agent connected to each debugging client via asynchronous Web services communication link, the debugging agent being adapted for executing the debugging template on a running process to be debugged.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
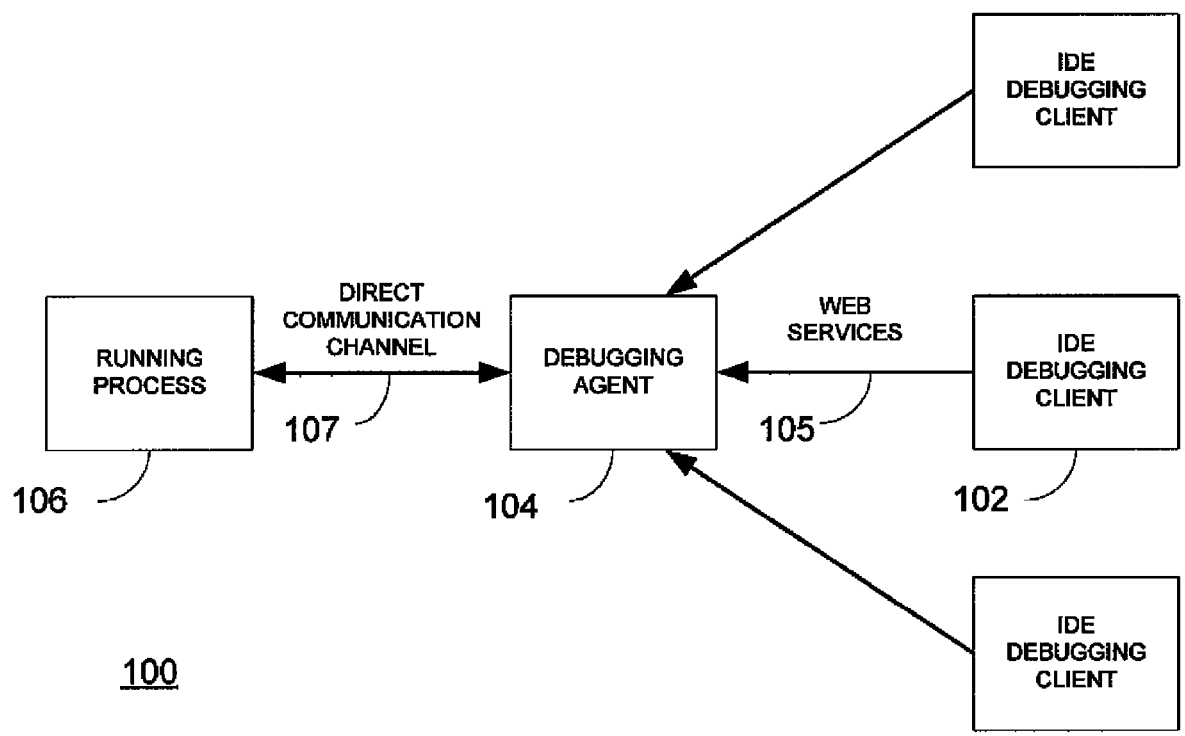
FIG. 1 illustrates a general architecture of an asynchronous debugging system.

This document describes a template based asynchronous debugging system and method. FIG. 1 illustrates a general architecture of an asynchronous debugging system 100. The debugging system 100 includes a debugging client 102 running in an IDE debugger that communicates asynchronously with a debugging agent 104 using a Web services connection 105.

A Web service is a piece of platform/system-independent, self-contained, self-describing application functionality that is designed and operates according to open Internet standards. According to a designated design and communication model, one application makes a Web service available for use (referred to as the service provider) and another application accesses and runs the provided service (referred to as the service consumer). Therefore, Web services can be used for communicating between different applications and software components that are written in different programming languages and running on different software or system platforms.

To overcome application and platform barriers, Web services are based on the following widely supported industry standards:

Standard communication protocols—Hypertext Transfer Protocol (HTTP) or Simple Mail Transfer Protocol (SMTP).

Standard data representation format—eXtensible Markup Language (XML) and XML using Simple Object Access Protocol (SOAP). SOAP is a protocol for exchanging XML-based documents via a network using a standard transport protocol, typically HTTP.

Standard service description language—Web Services Description Language (WSDL). WSDL is the language that is used to describe the public interface of a Web service. WSDL is used to define the service contract specification, which contains the interface description that is defined by the XML-based document. SOAP describes how to invoke a Web service that is described by the WSDL document.

Standard discovery language—Universal Description Discovery and Integration (UDDI). UDDI is a platform-independent protocol that enables applications and software components to look up (or "discover," in Web services terminology) available services in an XML-based service registry. UDDI is an industry initiative to standardize the discovery of Web services. UDDI defines a SOAP-based application programming interface (API) for querying centralized Web service repositories.

The debugging agent 104 is configured to communicate with the application or component running process 106 to be debugged via a direct communication channel 107, such as a socket connection. Accordingly, the debugging client 102 does not connect directly to the running process 106.

The debugging agent 104 is a program that connects to the running process 106 (e.g. Java process, Java Virtual Machine (JVM), ABAP process, APAP application server, C# process, Microsoft Common Runtime, etc.). In an exemplary implementation, the debugging agent 104 is a platform-specific (OS and runtime and/or process) agent or program that enables the connection to and control of the running process 106.

The connection between debugging client 102 and debugging agent 104 is a secure connection which uses a SSL (Secure Socket Layer) communication. This connection requires user authentication. The authenticated user is identified by the debugging agent 104 by client ID. Only an authenticated user can control and/or configure the debugging agent 104, such as transferring and activating a template based debugging breakpoint configuration, or in other words, a "breakpoint set" in the running process.

A "breakpoint set" is a template that is identified by an ID, called a template ID. The template contains a list or collection of breakpoints that includes the following data:

Resource name—a name of the Java class or ABAP program.

Line number—the number of the resource line (i.e. program line).

Breakpoint type—identification of either a "hard" or a "soft" breakpoint.

Repeat number—how many times the "soft" breakpoint temporarily stops the program execution and accumulates the debugging data (i.e. takes a snapshot of the current running process).

The "breakpoint set," depending on its purpose (e.g. "online" debugging, "offline" debugging, or intelligent tracing) may contain hard breakpoints, soft breakpoints or both.

The debugging client 102 preferably sends the template to the debugging agent 104 using Web services. From the debugging agent's 104 perspective, the template can be identified by client ID and template ID. This means only the same client can activate and deactivate, or delete, the current "breakpoint set." The same identification (client ID and template ID) is used by the debugging client 102 to obtain debugging data from the debugging agent 104. This means that each debugging client 102 can analyze debugging data separately.

Figure 2:
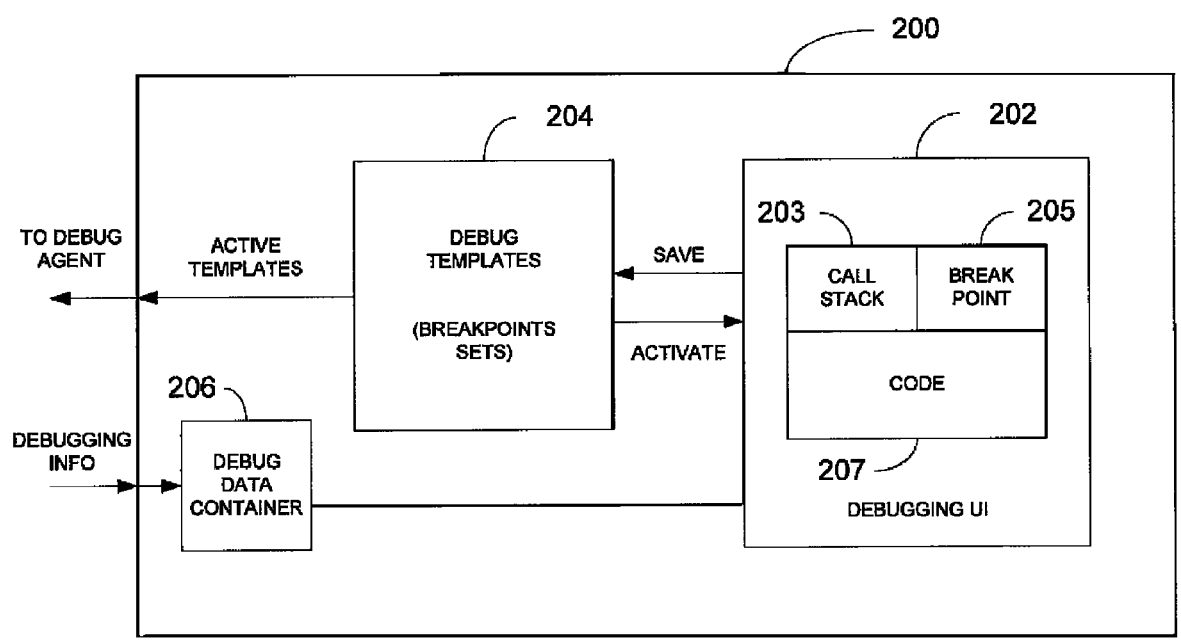
FIG. 2 illustrates a debugging client in greater detail.

FIG. 2 illustrates a debugging client 200 IDE having a debugging user interface (UI) 202 that provides a view in which an application expert or developer prepares and configures each debug template 204 with a number of "breakpoint sets" 205 defined in the code 207 that includes a call stack 203. Each template is stored in the debugger client 200 or local IDE which runs debugging client 200. The template can be transported via an import/export mechanism between different debugging clients, or sent to a customer for self-instrumenting their own systems.

The template may contain "hard" and "soft" breakpoints, and can be used to configure "online" and "offline" debugging—the debugging client 200 sets the breakpoint 205 and obtains the debugging data from the debugging agent whether the process is running or not. The debugging client 200 receives debugging data and information from the debugging agent, and stores it in a debugging data container 206. The debugging data from the debugging data container 206 can be displayed by the debugging UI 202 for evaluation, or sent to a different debugging client for analysis.

Many debugging clients 200 can connect to a debugging agent to configure it by setting "soft" breakpoints. Preferably only one debugging client can set any "hard" breakpoints that stop the process execution. Each template with breakpoints defines a configuration, and is assigned to a particular debugging client 200 and can be identified by a client ID and template ID.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method comprising:
defining a template in an integrated design environment of a debugging client, the template including a breakpoint set that defines a set of breakpoints within a process by which the process is stopped, the template including a configuration of both hard and soft breakpoints, wherein the hard breakpoint stops execution of the process and causes the process to exit and the soft breakpoint temporarily stops execution of the process to take one or more snapshots of the process and subsequently resumes execution of the process, wherein the debugging client does not connect directly to the process;
executing the template by a debugging agent, the debugging agent being connected to the process via a direct communication channel;
gathering, with the debugging agent, debugging data related to the process at each of the set of breakpoints;
transferring the debugging data to the debugging client; and
analyzing the debugging data regardless of whether the process is running,
wherein at least one of the defining, the executing, the gathering, transferring, and the analyzing is performed by at least one processor, and
wherein the direct communication channel includes a socket connection.

2. The method of claim 1, further comprising sending the template from the debugging client to the debugging agent for execution.

3. The method of claim 2, wherein the template is sent from the debugging client to the debugging agent via Web services communications.

4. The method of claim 1, wherein the template is defined by a client ID related to the debugging agent and a template ID.

5. The method of claim 1, further comprising transmitting a copy of the template to one or more other debugging clients.

6. A system comprising at least one programmable processor and memory, the memory storing instructions that cause the at least one programmable processor to execute:
- a debugging agent running one or more templates, each template being configured with a breakpoint set defined in debugging code for stopping execution of a process according to one or more breakpoints, the debugging agent being connected to the process via a direct communication channel, each template including a configuration of both hard and soft breakpoints, wherein the hard breakpoint stops execution of the process and causes the process to exit and the soft breakpoint temporarily stops execution of the process to take one or more snapshots of the process and subsequently resumes execution of the process; and
- one or more debugging clients, each debugging client having a user interface for defining at least one of the one or more templates, and being selectable to receive debugging information of the process based on the breakpoint set and configured to analyze the debugging information regardless of whether the process is running,
- wherein the one or more debugging clients does not connect directly to the process, and
- wherein the direct communication channel includes a socket connection.

7. The system of claim 6, further executing a communication link between the debugging agent and each of the one or debugging clients.

8. The system of claim 7, wherein the communication link operates according to a Web services standard.

9. The system of claim 6, wherein each of the one or more templates is defined by a client ID and a template ID.

10. The system of claim 9, wherein the client ID is associated with one of the one or more debugging clients that created the template.

11. A system comprising at least one programmable processor and memory, the memory storing instructions causing the at least one programmable processor to execute:
- a plurality of debugging clients, each debugging client being hosted in an integrated development environment that enables creation of a debugging template by a user; and
- a debugging agent connected to each debugging client via an asynchronous Web services communication link, the debugging agent configured to execute the debugging template on a process to be debugged, the debugging agent being connected to the process via a direct communication channel, the debugging template including a configuration of hard and soft breakpoints, wherein the hard breakpoint stops execution of the process and causes the process to exit and the soft breakpoint temporarily stops execution of the process to take one or more snapshots of the process and subsequently resumes execution of the process,
- wherein the plurality of debugging clients are not connected directly to the process and configured to analyze debugging information of the process regardless of whether the process is running, and
- wherein the direct communication channel includes a socket connection.

12. The system of claim 11, further executing a user interface provided by each debugging client.

13. A non-transitory computer-readable medium storing instructions that, when executed by at least one processor, cause the at least one processor to perform operations comprising:
- defining a template in an integrated design environment of a debugging client, the template including a breakpoint set that defines a set of breakpoints within a process by which the process is stopped, the template including a configuration of both hard and soft breakpoints, wherein the hard breakpoint stops execution of the process and causes the process to exit and the soft breakpoint temporarily stops execution of the process to take one or more snapshots of the process and subsequently resumes execution of the process, wherein the debugging client does not connect directly to the process;
- executing the template by a debugging agent, the debugging agent being connected to the process via a direct communication channel;
- gathering, with the debugging agent, debugging data related to the process at each of the set of breakpoints;
- transferring the debugging data to the debugging client; and
- analyzing the debugging data regardless of whether the process is running,
- wherein the direct communication channel includes a socket connection.

* * * * *